Figure 1:
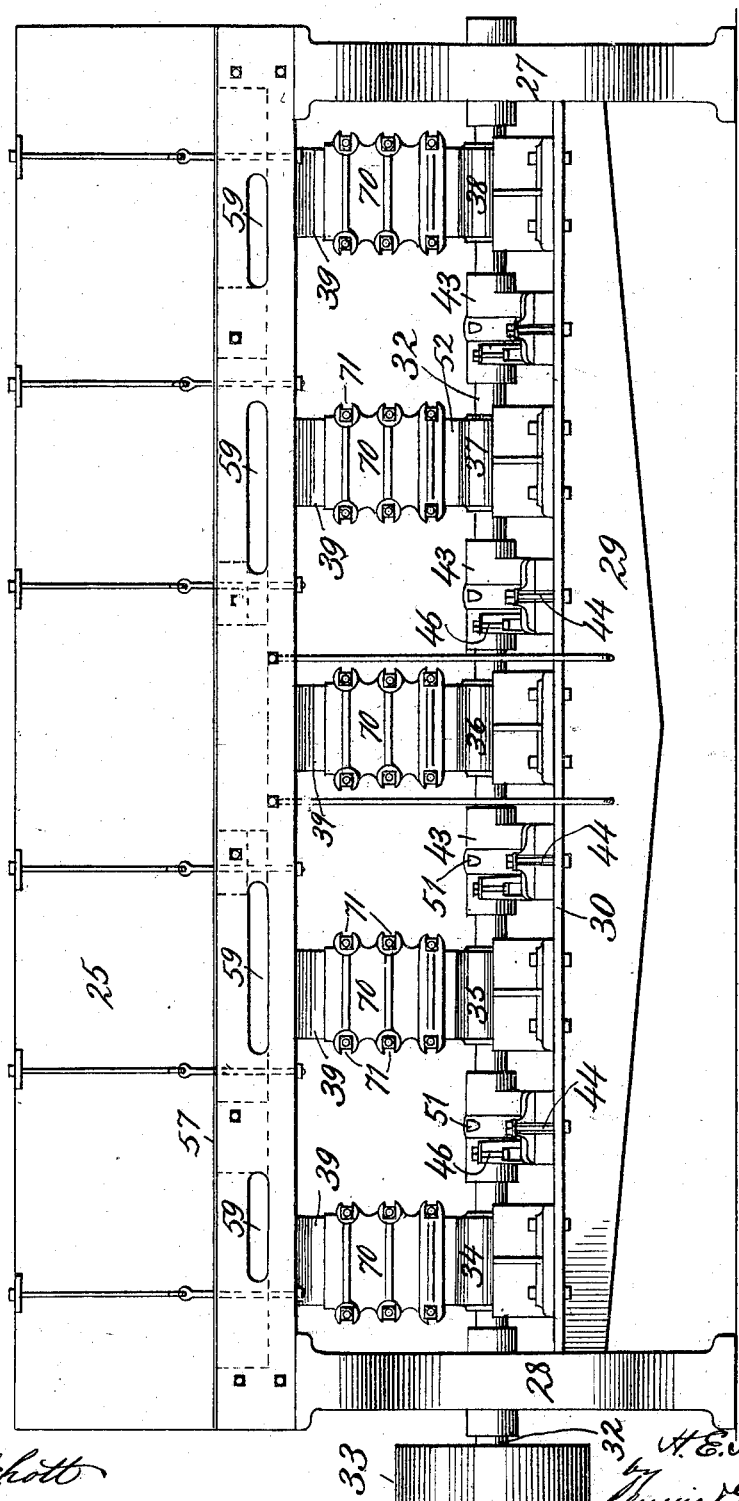

No. 627,244. Patented June 20, 1899.
H. E. TIDMARSH.
PAPER PULP SCREEN.
(Application filed Feb. 24, 1898.)
(No Model.) 9 Sheets—Sheet 1.

Witnesses
H. H. Schott
E. M. Young

Inventor
H. E. Tidmarsh,
by
Attorneys

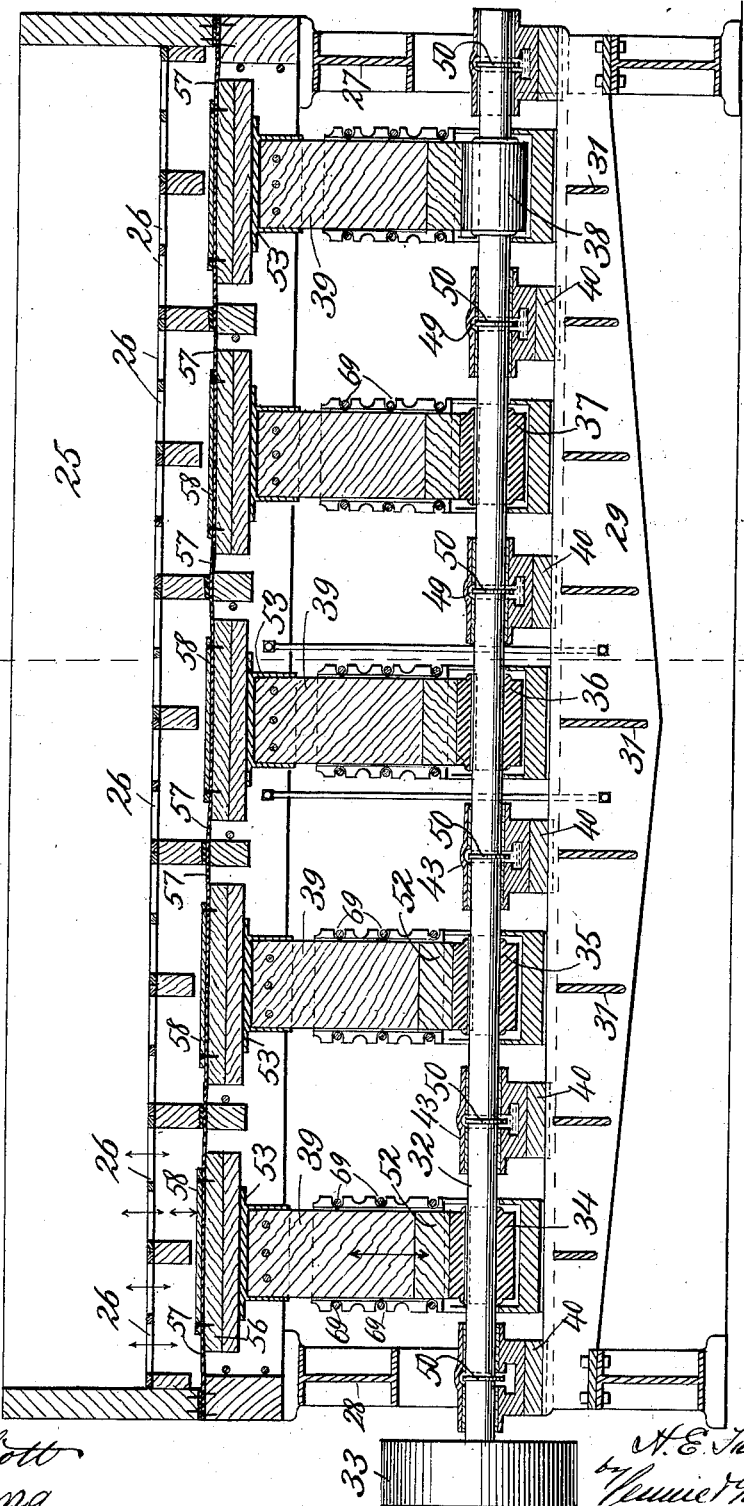

No. 627,244. Patented June 20, 1899.
H. E. TIDMARSH.
PAPER PULP SCREEN.
(Application filed Feb. 24, 1898.)
(No Model.) 9 Sheets—Sheet 3.
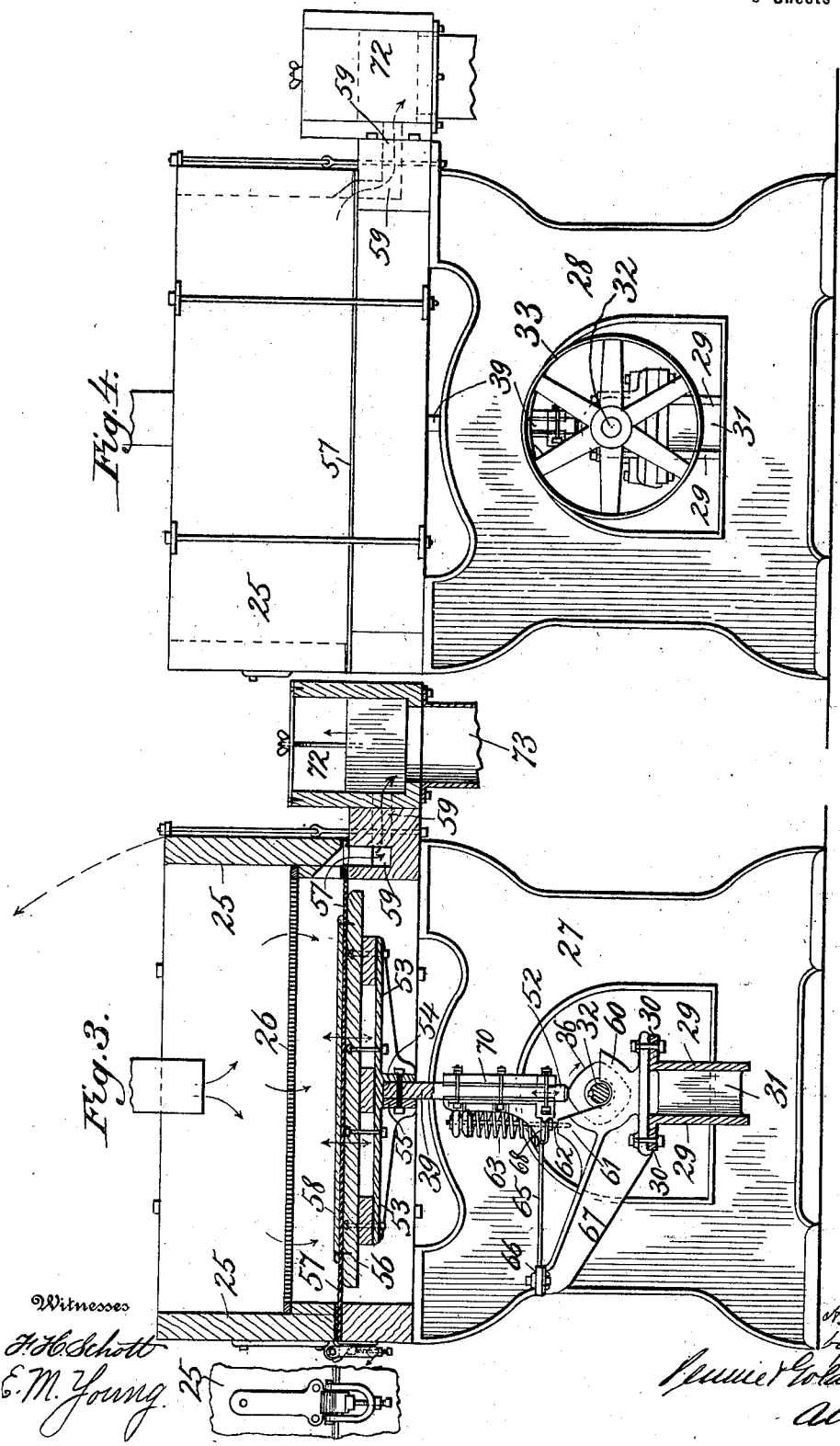

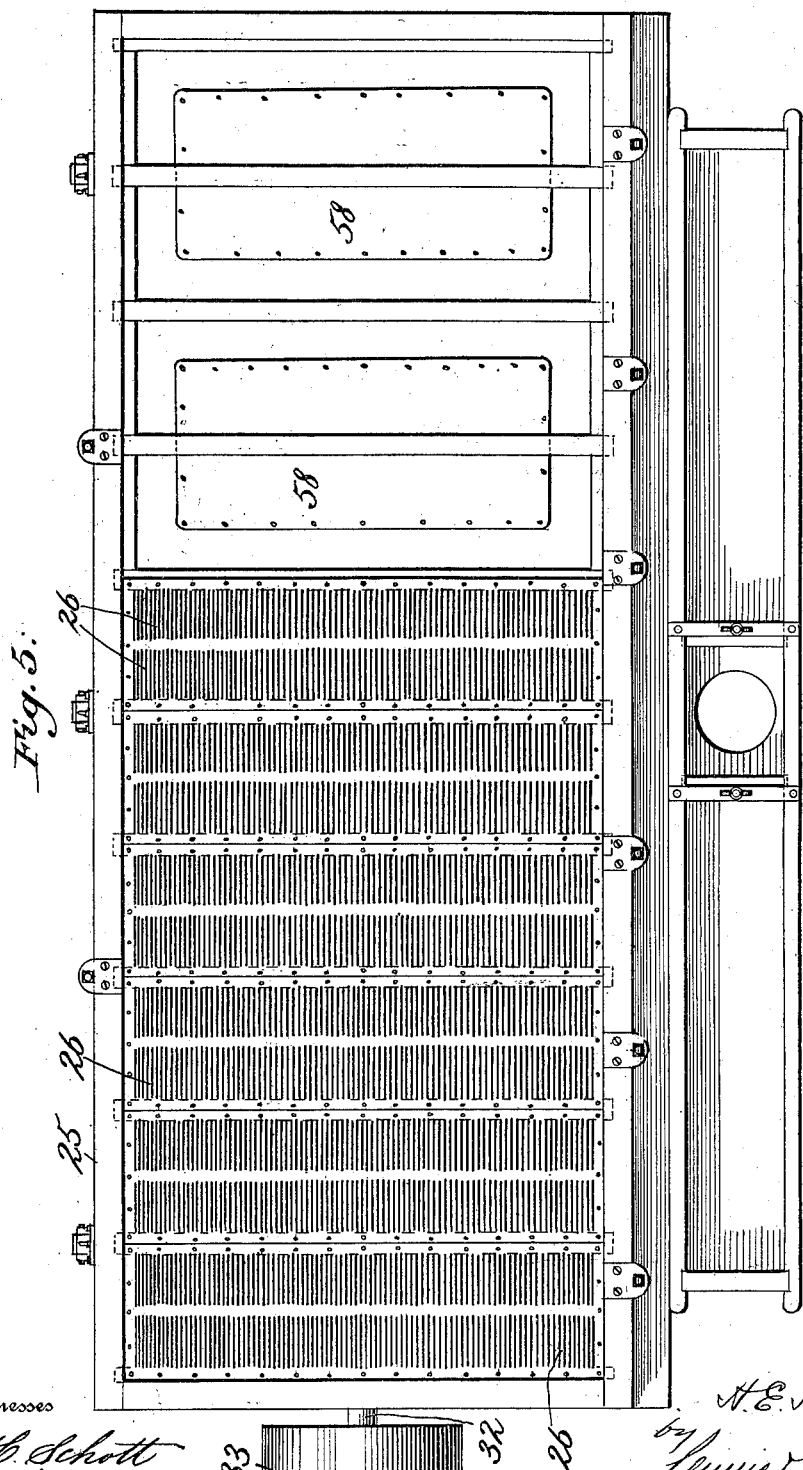

No. 627,244. Patented June 20, 1899.
H. E. TIDMARSH.
PAPER PULP SCREEN.
(Application filed Feb. 24, 1898.)
(No Model.) 9 Sheets—Sheet 5.
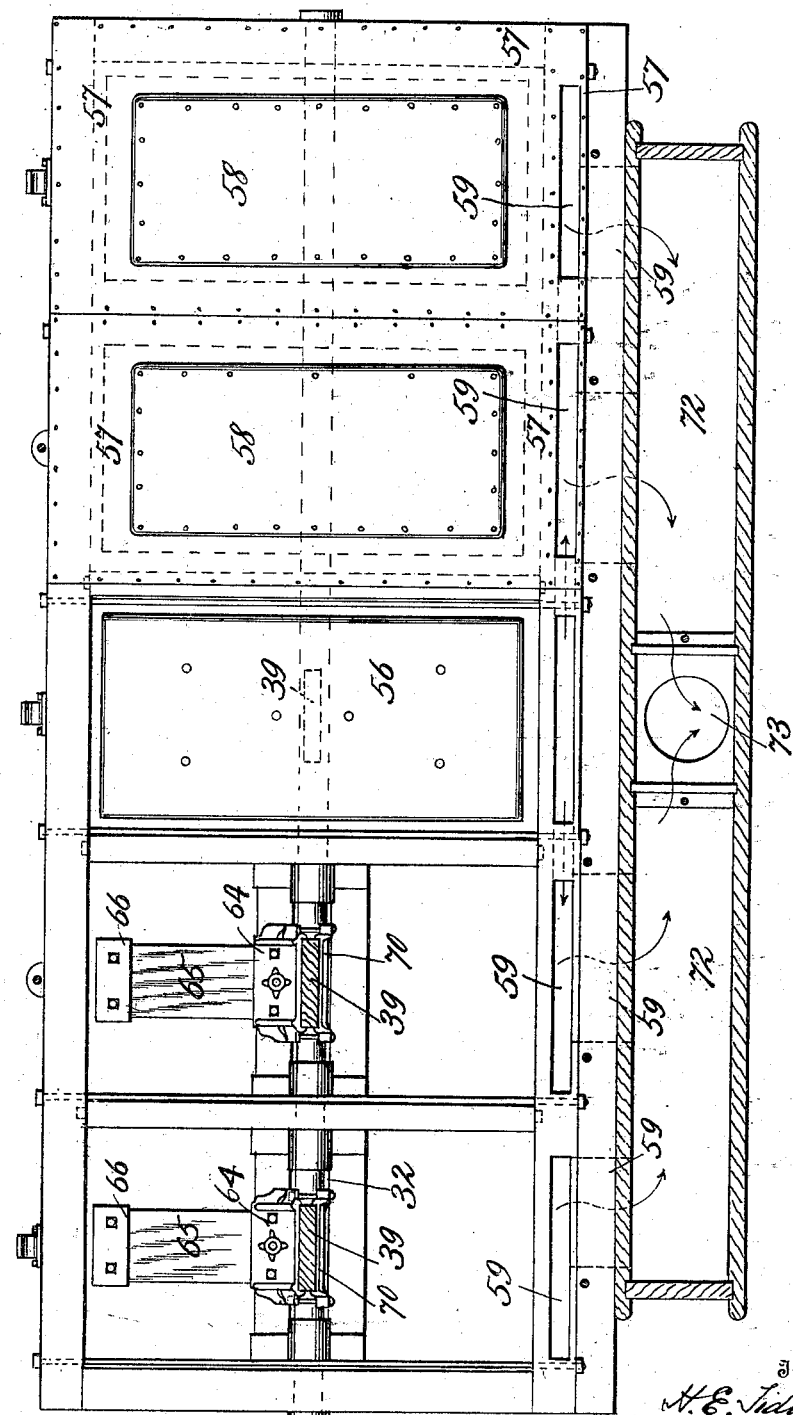

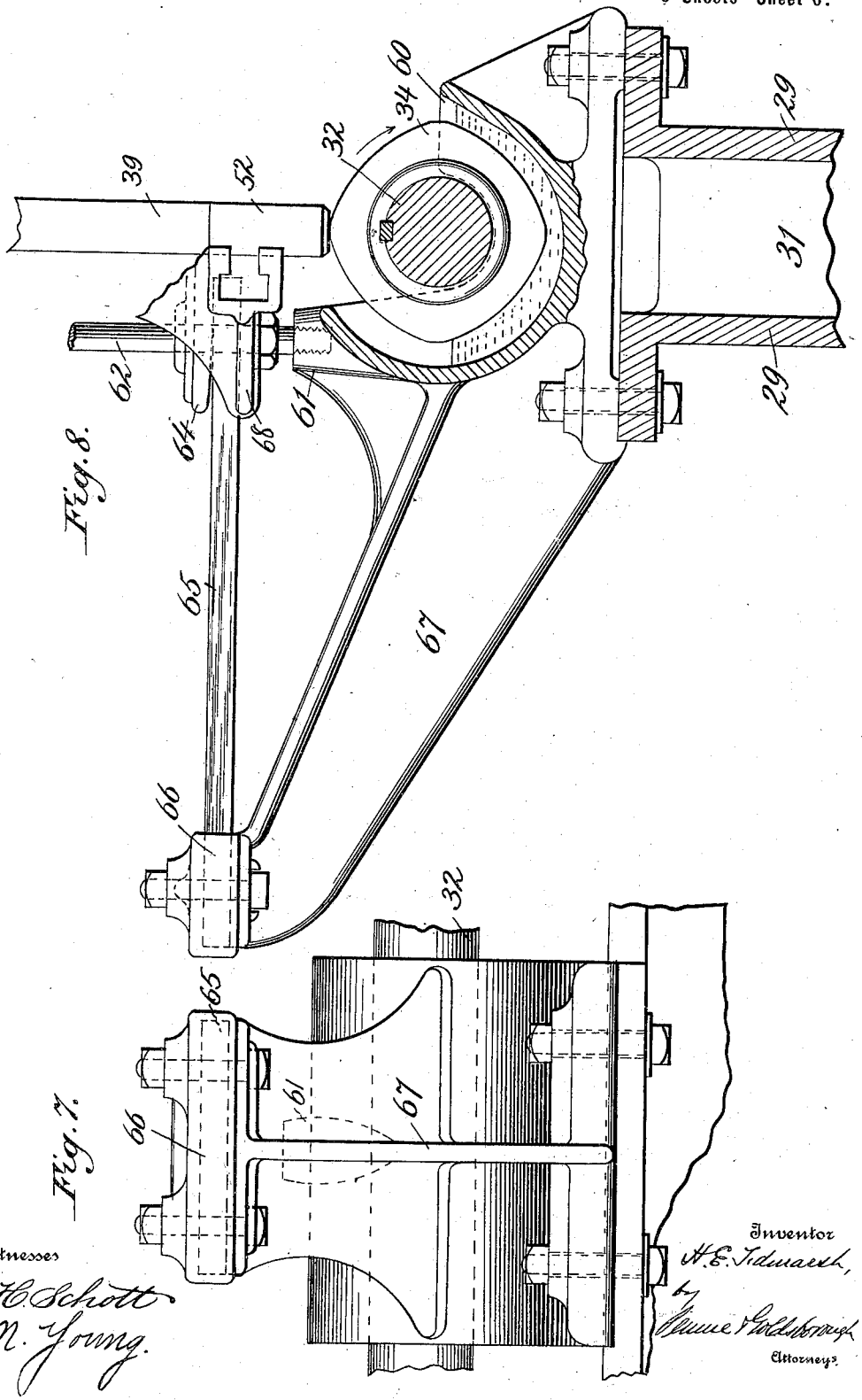

No. 627,244. Patented June 20, 1899.
H. E. TIDMARSH.
PAPER PULP SCREEN.
(Application filed Feb. 24, 1898.)
(No Model.) 9 Sheets—Sheet 7.
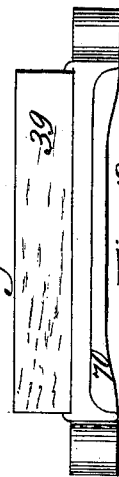
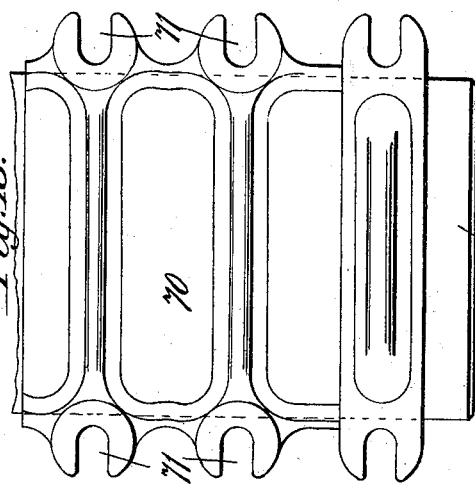
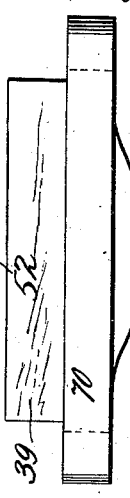
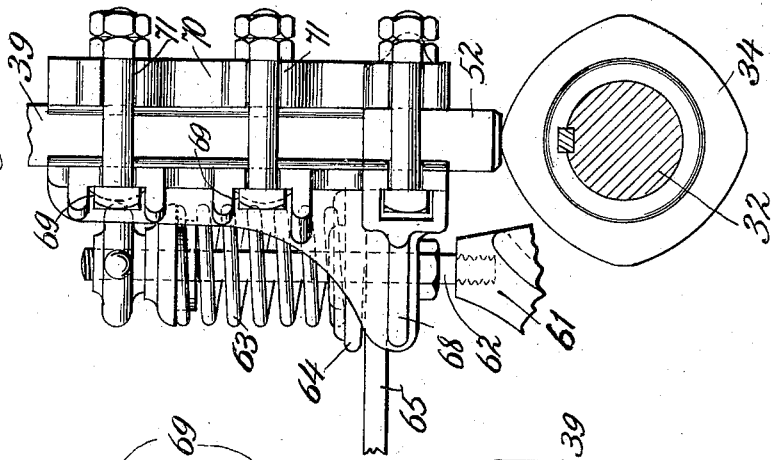
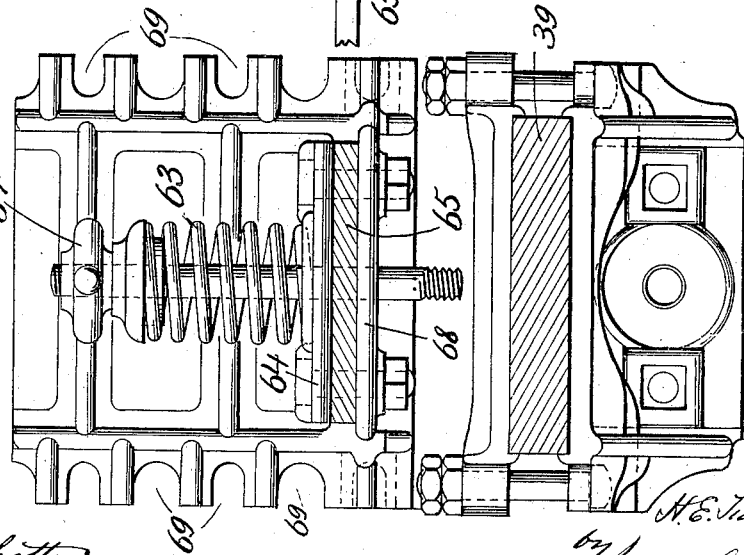

No. 627,244. Patented June 20, 1899.
H. E. TIDMARSH.
PAPER PULP SCREEN.
(Application filed Feb. 24, 1898.)
(No Model.) 9 Sheets—Sheet 8.
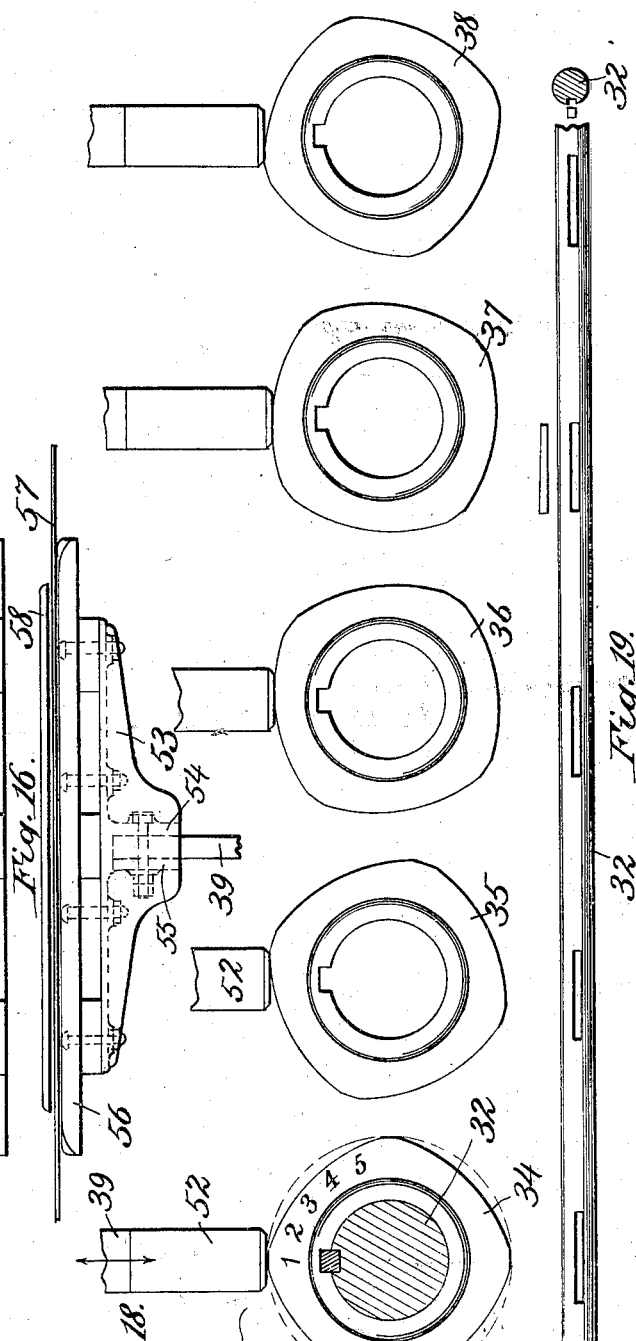
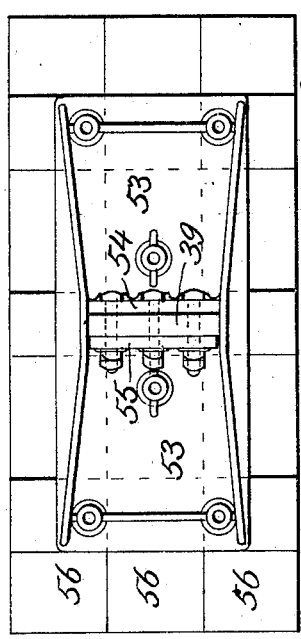
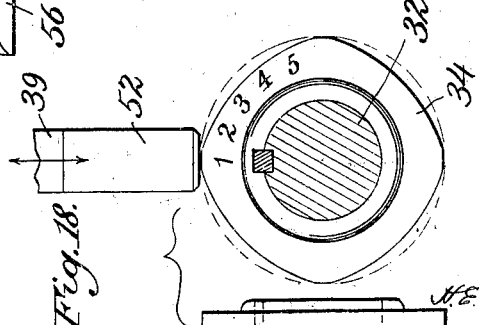
Witnesses
H. H. Schott
E. M. Young.
Inventor
H. E. Tidmarsh,
by James Goldsborough,
Attorneys
THE NORRIS PETERS CO., PHOTO-LITHO., WASHINGTON, D. C.

No. 627,244. Patented June 20, 1899.
H. E. TIDMARSH.
PAPER PULP SCREEN.
(Application filed Feb. 24, 1898.)
(No Model.) 9 Sheets—Sheet 9.
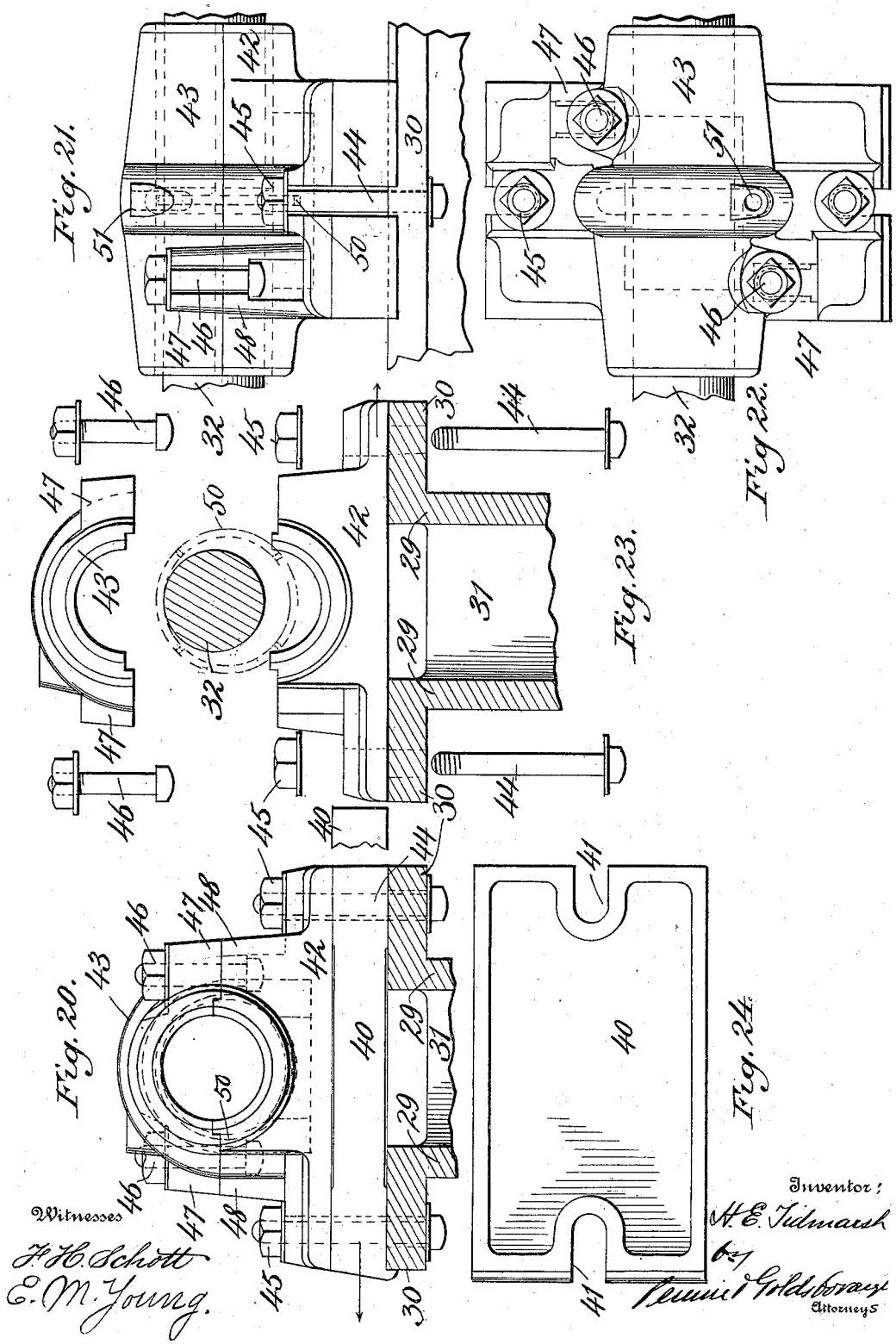
Witnesses
F. H. Schott
E. M. Young.
Inventor:
H. E. Tidmarsh
by
Samuel Goldsborough
Attorneys

UNITED STATES PATENT OFFICE.

HARRY ELMER TIDMARSH, OF SANDY HILL, NEW YORK.

PAPER-PULP SCREEN.

SPECIFICATION forming part of Letters Patent No. 627,244, dated June 20, 1899.

Application filed February 24, 1898. Serial No. 671,432. (No model.)

*To all whom it may concern:*

Be it known that I, HARRY ELMER TIDMARSH, a citizen of the United States, residing at Sandy Hill, county of Washington, State of New York, have invented certain new and useful Improvements in Paper-Pulp Screens; and I do hereby declare the following to be a full, clear, and exact description of the invention, such as will enable others skilled in the art to which it appertains to make and use the same.

My invention relates to certain new and useful improvements in paper-pulp screens of the kind wherein the ground stock mixed with water from the grinding-machines is received upon a screen by means of which coarse particles and foreign substances are separated and removed from the main body portion of commercially-valuable material.

In the accompanying drawings, Figure 1 represents in side elevation a screen embodying my improvements. Fig. 2 represents a longitudinal sectional view thereof. Fig. 3 represents a cross-sectional view on the line 3 3 of Fig. 2. Fig. 4 represents an end view. Fig. 5 represents a top plan view with the upper hinged vat portion in place. Fig. 6 represents a plan view, partly in section, of the apparatus with the upper hinged vat portion removed. Fig. 7 represents an end elevation of one of the oil-wells for the cams of the power-shaft together with its adjuncts. Fig. 8 represents a side elevation thereof, partly in section. Fig. 9 represents a rear view of the lower portion of one of the diaphragm-operating plungers together with the coiled spring thereof. Fig. 10 represents a plan view of the same, partly in section. Fig. 11 represents a side elevation thereof. Fig. 12 represents a top plan view of the plunger. Fig. 13 represents a side elevation thereof. Fig. 14 represents a bottom plan view thereof. Fig. 15 represents a bottom plan view of the diaphragm and its immediate connections.
Fig. 16 represents a side elevation thereof. Fig. 17 represents certain details of construction of said diaphragm. Fig. 18 represents the relative arrangement of the series of cams upon the power-shaft at a given period. Fig. 19 represents the power-shaft and its several keyways. Fig. 20 represents in side elevation one of the removable journal-boxes for the power-shaft with its removable foundation-plate in place. Fig. 21 represents a front elevation thereof. Fig. 22 represents a top plan view. Fig. 23 represents the journal-box with its parts disassociated and the foundation-plate removed. Fig. 24 represents a top plan view of the foundation-plate detached.

Similar numerals of reference indicate similar parts throughout the several views.

The main body portion of the screen consists of a stationary lower frame, to which is hinged an upper swinging frame 25, having a series of cross-timbers, upon which is supported and secured the usual screen 26, preferably consisting of transversely-arranged plates of metal having a multiplicity of slits of such capacity as to permit the passage of stock of the desired degree of subdivision, but not permitting the passage of coarser and unavailable particles. The hinge connection, as illustrated in Fig. 3, is of such character as to permit the top portion to be not only thrown back upon its hinges to the fullest extent, but so as to be readily removed as an entirety from the lower portion should that be necessary.

The lower or stationary part of the frame is conveniently mounted upon two stout end castings 27 28, which support the longitudinal stringers 29, these stringers being flanged at 30 and being deeper at their center than at their ends, so as to increase their bearing capacity accordingly. The stringers are connected by tie-pieces 31 and are preferably cast integral with said tie-pieces, so as to constitute a unitary structure of great strength and carrying capacity.

The power-shaft 32 is adapted to be driven from the drive-pulley 33 and extends longitudinally of the frame above the stringers or girders 29. It is sustained from said girders by means of a series of journal-boxes, said journal-boxes being mounted on opposite sides of a corresponding series of cams 34 35 36 37 38, which operate the several vertical reciprocating plungers 39.

As indicated in detail in Figs. 21 to 24, inclusive, the journal-boxes are so mounted upon the sustaining stringers or girders that any individual journal-box may be removed (for the purpose of being rebabbitted or the like) without interfering with any of the other journal-boxes and without stopping the rotation of the power-shaft. To this end each journal-box is mounted upon a removable foundation-plate 40, provided with slots or recesses 41, registering with like slots in the flanges of the lower portion 42 of the journal-box. By means of screw-threaded bolts 44 passing through the slots or recesses referred to and passing through suitable perforations in the top flanges of the stringers 29 the foundation-plate and the lower portion of the journal-boxes are removably secured to the stringers, suitable retaining-nuts 45 serving to hold the parts together. The upper portion 43 of the journal-box is adapted to be secured to the lower portion by means of the bolts and nuts 46, which serve to clamp together the lugs 47 48 upon the upper and lower portions of the journal-box, respectively. In Figs. 20, 21, and 22 the parts are shown assembled. In order to disassemble them, and thereby remove one of the journal-boxes, the bolts 44 are first removed, whereupon the foundation-plate 40 may be slid out from under the lower portion of the journal-box. The lower portion of the journal-box will thereupon be lowered to the position indicated in Fig. 23, the upper portion 43 having been first removed by loosening the nuts on the bolts 46 and sliding the bolts out of their recesses. The lower portion of the journal-box being now below the level of the power-shaft may be at once removed by sliding it out from under the shaft. By reversal of the operation described the journal-box may be reinserted in place after having undergone the desired repair. The journal-box is provided with a suitable internal chamber or recess 49 (see Fig. 2) for the reception of the oil or other lubricant employed, and the shaft has a loose annulus or ring 50 for each journal-box, said ring dipping into the lubricant, so as to appropriately convey it to the bearings. The supply of oil may be renewed from time to time through the feed-opening 51.

The reciprocating plungers 39, operated by the cams, are preferably provided with renewable wooden shoes 52. To the upper portion of each plunger is secured a top plate 53 by means of screw-bolts passing through the web of the plunger and through cheek-pieces 54 55, one of which constitutes a downwardly-projecting flange of the top plate 53, and the other of which is preferably a separate piece, as indicated more fully in Figs. 3, 15, 16, and 17. To the top plate 53 is secured the lower plate 56 of the diaphragm by means of screw-threaded bolts, as indicated, and upon the plate 56 rests the flexible portion of the diaphragm, consisting, preferably, of a single sheet of india-rubber 57, secured to the wooden plate 56 by means of a retaining-plate 58, held in place by a peripheral series of wood-screws, as shown more fully in Figs. 3, 5, and 6. The india-rubber sheet 57 is secured to the edges of the framework by means of a peripheral series of wood-screws and extends entirely over the opening 59 for the exit of the screened pulp and is provided with a slot corresponding to said opening, thereby reducing the liability to leakage to the minimum, inasmuch as the rubber sheet entirely covers the space upon which it is superposed, leaving no joint.

The several cams revolve in oil-wells 60, so that their surfaces may be kept well lubricated. Within a projection 61 of the wall of the oil-well in each instance is screwed the lower end of a vertical stud or pin 62, which stud passes through the interior of a coiled spring 63 and is screw-threaded at its upper end for the reception of a revoluble nut 84, which receives the impact of the upper end of the spring 63, and whereby the tension of the spring may be appropriately regulated. The lower convolution of the spring 63 rests upon a plate 64, which rests upon one end of a spring-plank 65, preferably of wood, the said spring-plank being fixed at its opposite end to the outer extremity 66 of an arm 67, projecting from the wall of the oil-well. The plate 64 and the spring-plank 65 are connected by means of bolts and nuts with a flange 68, forming part of a stout casting having a series of recesses 69. The casting referred to and a companion casting 70, having a series of recesses 71, serve to firmly clamp the lower end of the plunger 39, so that when the plunger is raised by the cam it will carry upward with it the two cheek-pieces and will consequently compress the spring 63 and raise the outer end of the spring-plank 65 to the limited extent necessary in apparatus of this character. It is obvious that the reaction of the spring 63 and of the spring-plank 65 will tend constantly to keep the wooden shoe of the plunger in contact with the surface of the cam, and consequently will insure a smooth and uniform reciprocation of the plunger and an appropriate reciprocation of the diaphragm. It will be evident that the spring-plank may be omitted, although for most purposes I prefer to employ it. If the spring-plank is omitted, the spring 63 would rest directly upon the flange 68, as will be readily understood.

The operation of the apparatus will be readily understood by those skilled in the art. As illustrated in Fig. 18, the several cams are relatively so mounted upon the shaft that when the right-hand plunger is at the upper limit of its stroke the left-hand plunger will be at the lowermost limit thereof, the intermediate plungers occupying successively-graded intermediate positions. I find by this expedient that the strain upon the apparatus as a whole is considerably lessened and more uniformly distributed. The reciprocation of the diaphragms due to the rise and fall of the plungers alternately tends to draw the pulp downward through the slots of the screen and to clear said slots of obstructions or impediments, as is well understood in the art. The strained pulp passes through the openings 59 and enters the collecting-box 72, from which it may conveniently pass by a discharge-pipe 73 to the paper-making machinery.

I do not claim herein any combinations embodying both the lever or spring-plank and the spring as elements, for the reason that claims therefor are presented in a divisional application filed by me August 29, 1898.

Having thus described my invention, what I claim is—

1. In a paper-pulp screen, the combination with a diaphragm-operating plunger, of a coiled spring arranged at one side thereof, and cheek-pieces clamped to the plunger and having a lateral projection extending beneath the spring.

2. In a paper-pulp screen, the combination with a diaphragm-operating plunger, of a coiled spring arranged at one side thereof, and cheek-pieces clamped to the plunger and having a lateral projection extending beneath the spring, said cheek-pieces being provided with slotted lugs for the reception of clamping-bolts.

3. In a paper-pulp screen, the combination with a diaphragm-operating plunger, of a coiled spring arranged at one side thereof, cheek-pieces clamped to the plunger and having a lateral projection extending beneath the spring, and a retaining-stud passing centrally through the spring and provided at its upper end with an adjusting-cap.

4. In a paper-pulp screen, a diaphragm having a flexible border secured at its edges to the frame and extending over the pulp-exit opening therein, said diaphragm having a slot corresponding to said opening.

5. In a paper-pulp screen, a diaphragm provided with an under plate, an upper plate, and an intermediate sheet of rubber or other flexible material, the border of said sheet being secured at its edges to the frame and extending over the pulp-exit opening therein and having a slot corresponding to said opening.

6. In a pulp-strainer, the combination of a frame provided with outlets, a screen-box provided with screen-plates, a diaphragm having openings registering with the outlets of the frame, a pulp-receiving box, and an outlet-pipe from the outlets of the frame to the pulp-box, substantially as described.

7. In a pulp-strainer, the combination of a frame provided with outlets, a screen-box provided with screen-plates, a diaphragm having openings registering with the outlets of the frame, a pulp-receiving box having an overflow leading to the outlet, an outlet-pipe from the inlets of the frame to the pulp-box, and a vertical sliding gate in the pulp-box, substantially as described.

8. In a pulp-strainer, the combination of a frame, a screen-box, a diaphragm extending throughout the length and width of box, the box and frame being provided with transverse beams located one over the other and having a diaphragm between them as a packing to form a number of suction-chambers between the diaphragm and screen carried in the screen-box, substantially as described.

9. In a paper-pulp screen, having a series of diaphragm-operating plungers, of a corresponding series of cams for operating the plungers, said cams being of like configuration, but arranged upon the cam-shaft at progressively-varying angular positions, so that when the first plunger of the series is at the upper limit of its throw, the last plunger will be at the lower limit of its throw, and the intermediate plungers at successively-graduated positions.

10. In a paper-pulp screen, the combination with the frame, of the plunger-operating power-shaft extending longitudinally thereof, journal-boxes interposed between adjacent plungers, and insertible and removable foundation-plates for the several journal-boxes, said plates being supported by the frame and supporting the journal-boxes.

11. In a paper-pulp screen, the combination with the frame provided with longitudinally-extending flanged girders, of the plunger-operating power-shaft, removable foundation-plates upon said girders, and journal-boxes resting upon the said foundation-plates.

12. In a paper-pulp screen, the combination with the frame provided with longitudinally-extending flanged girders, of the plunger-operating power-shaft, removable foundation-plates upon said girders, journal-boxes upon the said foundation-plates, and removable clamping-bolts passing through slots in the foundation-plate and in the flanges of the girder and journal-boxes.

In testimony whereof I affix my signature in presence of two witnesses.

HARRY ELMER TIDMARSH.

Witnesses:
ELBERTHA ACKLEY,
JOHN TOOLE.